United States Patent
Fukui et al.

(10) Patent No.: US 12,451,296 B2
(45) Date of Patent: Oct. 21, 2025

(54) SOLID ELECTROLYTIC CAPACITOR

(71) Applicant: Panasonic Intellectual Property Management Co., Ltd., Osaka (JP)

(72) Inventors: Hitoshi Fukui, Saga (JP); Katsuhiro Ogasawara, Kyoto (JP); Atsushi Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 141 days.

(21) Appl. No.: 18/549,635

(22) PCT Filed: Mar. 3, 2022

(86) PCT No.: PCT/JP2022/009126
§ 371 (c)(1),
(2) Date: Sep. 8, 2023

(87) PCT Pub. No.: WO2022/191029
PCT Pub. Date: Sep. 15, 2022

(65) Prior Publication Data
US 2024/0161983 A1    May 16, 2024

Related U.S. Application Data (60) Provisional application No. 63/160,464, filed on Mar. 12, 2021.

(30) Foreign Application Priority Data

May 31, 2021   (JP) .................................. 2021-091791

(51) Int. Cl.
*H01G 9/012* (2006.01)
*H01G 9/08* (2006.01)
(Continued)

(52) U.S. Cl.
CPC ............... *H01G 9/012* (2013.01); *H01G 9/08* (2013.01); *H01G 9/15* (2013.01); *H01G 9/26* (2013.01)

(58) Field of Classification Search
None
See application file for complete search history.

(56) References Cited

U.S. PATENT DOCUMENTS 4,814,947 A * 3/1989 Gunter .................. H01G 9/012
361/540
6,791,822 B2 * 9/2004 Kochi ...................... H01G 9/26
29/25.03
(Continued)

FOREIGN PATENT DOCUMENTS

| JP | 58-112321 | 7/1983 |
| JP | 01-261813 | 10/1989 |

(Continued)

OTHER PUBLICATIONS

International Search Report of PCT application No. PCT/JP2022/009126 dated May 24, 2022.

*Primary Examiner* — Dion R. Ferguson
(74) *Attorney, Agent, or Firm* — Rimon P.C.

(57) ABSTRACT

A solid electrolytic capacitor includes at least one capacitor element including an anode part and a cathode part, an anode lead terminal, a cathode lead terminal, and an exterior body covering the capacitor element. Each of the anode lead terminal and the cathode lead terminal has a main surface and a side surface, and includes a buried part buried in the exterior body and an exposed part exposed from the exterior body. In at least one of the anode lead terminal or the cathode lead terminal, at least a part of a main surface of the exposed part is covered with a low-melting-point material, and a first side surface region in a side surface of the buried part is not covered with the low-melting-point material. The (Continued)

first side surface region is a region away from a boundary between the buried part and the exposed part by more than 0.36 mm.

12 Claims, 5 Drawing Sheets

(51) Int. Cl.
*H01G 9/15* (2006.01)
*H01G 9/26* (2006.01)

(56) References Cited

U.S. PATENT DOCUMENTS

| | | | |
|---|---|---|---|
| 2009/0237865 A1 | 9/2009 | Komazawa et al. | |
| 2015/0357122 A1* | 12/2015 | Matsubara | H01G 9/15 |
| | | | 29/25.03 |
| 2019/0333705 A1* | 10/2019 | Sato | H01G 9/025 |
| 2024/0161983 A1* | 5/2024 | Fukui | H01G 9/08 |

FOREIGN PATENT DOCUMENTS

| | | | | |
|---|---|---|---|---|
| JP | H02132927 U | * | 11/1990 | |
| JP | 2002-203745 A | | 7/2002 | |
| JP | 2010-067876 | | 3/2010 | |
| JP | 2019-207905 | | 12/2019 | |
| JP | 7032239 B2 | * | 3/2022 | H01L 27/10 |
| WO | 2007/052652 | | 5/2007 | |
| WO | 2018/131691 | | 7/2018 | |

* cited by examiner

SOLID ELECTROLYTIC CAPACITOR

CROSS-REFERENCE TO RELATED APPLICATIONS

This application is a U.S. national stage application of the PCT International Application No. PCT/JP2022/009126 filed on Mar. 3, 2022, which claims the benefit of U.S. provisional patent application No. 63/160,464 filed on Mar. 12, 2021, and which claims the benefit of foreign priority of Japanese patent application No. 2021-091791 filed on May 31, 2021, the contents all of which are incorporated herein by reference.

TECHNICAL FIELD

The present disclosure relates to a solid electrolytic capacitor.

BACKGROUND

Solid electrolytic capacitors are mounted on various electronic devices. The solid electrolytic capacitors each typically include an anode lead terminal and a cathode lead terminal electrically connected to a capacitor element, and an exterior body covering the capacitor element.

Unexamined Japanese Patent Publication No. 2010-67876 discloses a chip-type solid electrolytic capacitor including: a solid electrolytic capacitor element including an anode body made of a valve metal from which an anode lead is drawn, and a cathode lead-out layer including an oxide film formed on a surface of the anode body, a solid electrolyte layer formed on the oxide film, and a graphite layer and a silver paste layer formed on the solid electrolyte layer; and a lead frame terminal in a plate shape that is connected to the cathode lead-out layer by a conductive adhesive. The lead frame terminal includes a first plating layer serving as a base formed throughout on opposite surfaces of the lead frame terminal, and a second plating layer made of a noble metal and formed only on a surface of the first plating layer in contact with the conductive adhesive (see FIG. 1).

SUMMARY

A solid electrolytic capacitor according to an aspect of the present disclosure includes: at least one capacitor element including an anode part and a cathode part; an anode lead terminal including an anode connection surface electrically connected to the anode part; a cathode lead terminal including a cathode connection surface electrically connected to the cathode part; and an exterior body covering the at least one capacitor element. Each of the anode lead terminal and the cathode lead terminal has a main surface and a side surface intersecting the main surface, and includes a buried part buried in the exterior body, and an exposed part exposed from the exterior body. The main surface of the anode lead terminal includes the anode connection surface, and the main surface of the cathode lead terminal includes the cathode connection surface. In at least one lead terminal selected from the anode lead terminal or the cathode lead terminal, at least a part of the main surface of the exposed part is covered with a low-melting-point material, and in the side surface of the buried part, a first side surface region is not covered with the low-melting-point material. The first side surface region is a region away from a boundary between the buried part and the exposed part by more than 0.36 mm.

SUMMARY

A solid electrolytic capacitor according to an aspect of the present disclosure includes: at least one capacitor element including an anode part and a cathode part; an anode lead terminal including an anode connection surface electrically connected to the anode part; a cathode lead terminal including a cathode connection surface electrically connected to the cathode part; and an exterior body covering the capacitor element. The anode lead terminal and the cathode lead terminal have a main surface including the anode connection surface and a main surface including the cathode connection surface, respectively, and a side surface intersecting the main surface, and each include a buried part buried in the exterior body, and an exposed part exposed from the exterior body. In at least one lead terminal selected from the anode lead terminal or the cathode lead terminal, at least a part of the main surface of the exposed part is covered with a low-melting-point material, and in the side surface of the buried part, at least a first side surface region is not covered with the low-melting-point material. The first side surface region is a region away from a boundary between the buried part and the exposed part by more than 0.36 mm.

A comprehensive or specific aspect of the present disclosure may be implemented by a solid electrolytic capacitor, a device and a system including the solid electrolytic capacitor, a method using the device and the system, or any combination thereof.

The present disclosure provides a solid electrolytic capacitor having high heat resistance.

DESCRIPTION OF EMBODIMENT

Prior to the description of an exemplary embodiment, problems in the conventional technology will be briefly described below.

Figure 2:
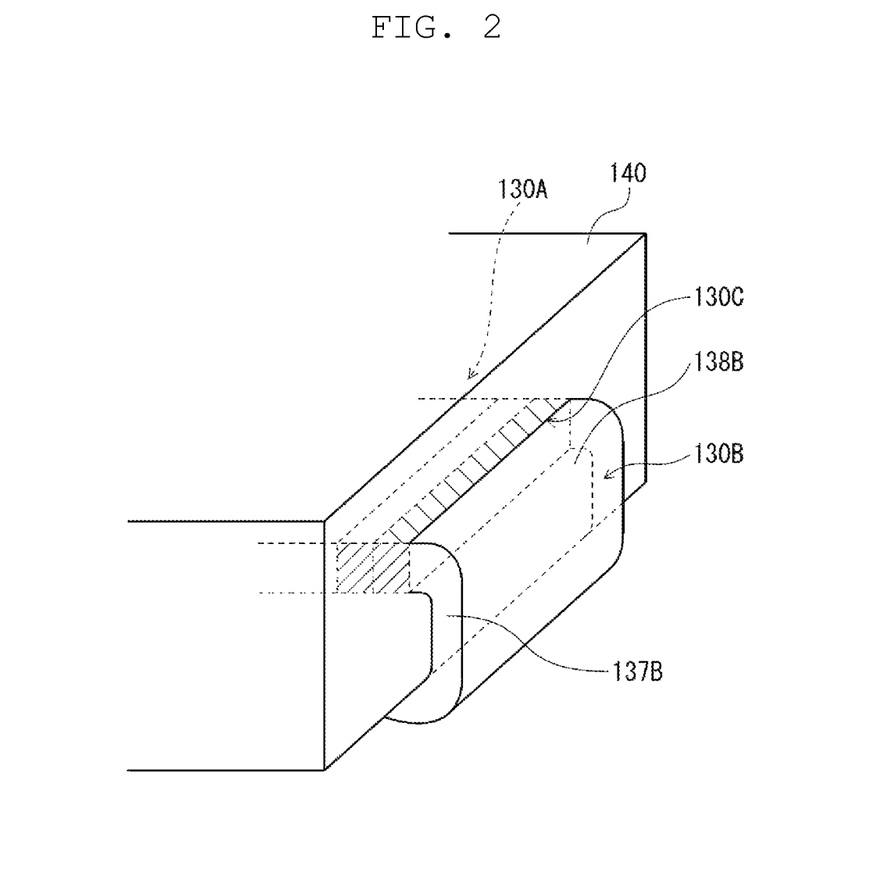
FIG. 2 is a perspective view schematically illustrating structure of a main part of the solid electrolytic capacitor illustrated in FIG. 1.

Unexamined Japanese Patent Publication No. 2010-67876 proposes the chip-type solid electrolytic capacitor in which a tin plating layer is formed on a first plating layer only in at least a part of a place where a second plating layer is not formed on a surface flush with a surface of a lead frame on which the second plating layer is formed (see FIG. 2). Unexamined Japanese Patent Publication No. 2010-67876 also proposes the chip-type solid electrolytic capacitor in which the tin plating layer is formed on the first plating layer in at least a part of a surface opposite to the surface of the lead frame on which a second plating layer is formed (see FIG. 3).

Figure 3:
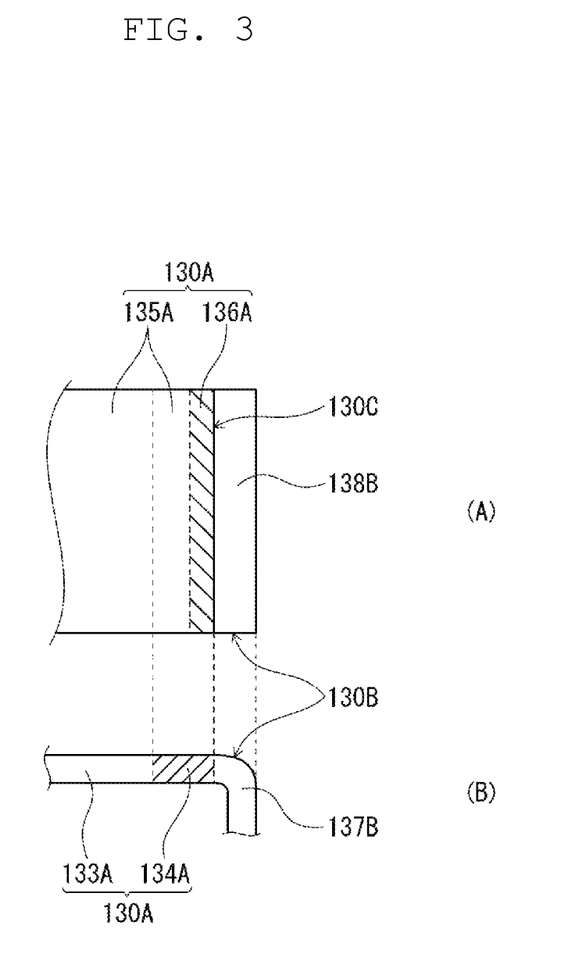
FIG. 3 includes plan view (A) and side view (B) that schematically illustrate a cathode lead terminal in a main part of the solid electrolytic capacitor illustrated in FIG. 2.

Unfortunately, when a low-melting-point material such as a tin plating layer exists in a region of lead frames 24, 34, the region being in contact with outer packaging resin 2 as illustrated in FIGS. 2, 3 of Unexamined Japanese Patent Publication No. 2010-67876, the low-melting-point material melts, moves, and segregates, and thus a void may be generated between lead frames 24, 34 and outer packaging resin 2 when the solid electrolytic capacitor is heated at a high temperature (e.g., when the solid electrolytic capacitor is mounted on a substrate). As a result, the inside of the solid electrolytic capacitor is likely to communicate with external environment, so that the solid electrolytic capacitor is likely to deteriorate.

In view of the above problems, the present disclosure enables a solid electrolytic capacitor having high heat resistance to be fabricated.

Hereinafter, an exemplary embodiment of the present disclosure will be described with reference to examples, but the present disclosure is not limited to examples to be described below. Although specific numerical values and materials may be provided as examples in description below, other numerical values and materials may be applied as long as the effect of the present disclosure can be obtained. For components other than characteristic parts of the present disclosure, components of known solid electrolytic capacitors may be applied. The term, a "range from numerical value A to numerical value B", herein means that numerical value A and numerical value B are included in the range.

A solid electrolytic capacitor according to an exemplary embodiment of the present disclosure includes at least one capacitor element including an anode part and a cathode part, an anode lead terminal including an anode connection surface electrically connected to the anode part, a cathode lead terminal including a cathode connection surface electrically connected to the cathode part, and an exterior body covering the capacitor element.

Each of the anode lead terminal and the cathode lead terminal has a main surface including corresponding one of an anode connection surface or a cathode connection surface and a side surface intersecting with the main surface, and includes a buried part buried in the exterior body and an exposed part exposed from the exterior body.

The main surface is divided into a front surface and a back surface (here, main surface A and main surface B opposite to main surface A). The side surface extends corresponding to a contour line of the lead terminal in viewing in a normal direction of the main surface, and has a linear minute area having a width corresponding to a thickness of the lead terminal. The side surface includes a side surface that extends over the buried part and the exposed part and that is here focused. Such a side surface is also divided into one side and the other side (here, side surface A and side surface B opposite to side surface A).

Specifically, there are typically two first side surface regions and two second side surface regions described later, and there are also typically two first main surface regions and two second main surface regions. The present embodiment intends that conditions A, B and other conditions below are to be satisfied in the respective first side surface regions and the respective first main surface regions. Additionally, conditions described later and to be satisfied by the second side surface region and the second main surface region are intended to be satisfied in the respective second side surface regions and the respective second main surface regions.

In at least one lead terminal (also referred to below as "lead terminal A") selected from the anode lead terminal or the cathode lead terminal, at least a part of the main surface of the exposed part is covered with a low-melting-point material.

Then, the buried part of lead terminal A satisfies condition A below.

<Condition A>

In the side surface of the buried part of lead terminal A, at least a first side surface region, which is a region away from the boundary between the buried part and the exposed part by more than 0.36 mm, is not covered with the low-melting-point material. The first side surface region is a region having a distance greater than 0.36 mm along an extended part of lead terminal A from the boundary.

Lead terminal A desirably further satisfies condition B below.

<Condition B>

In the main surface of the buried part lead terminal A, at least a first main surface region, which is a region away from the boundary between the buried part and the exposed part by more than 0.15 mm, is not covered with the low-melting-point material. The first main surface region is a region having a distance greater than 0.15 mm along the extended part of lead terminal A from the boundary.

Here, the distance along the extended part of lead terminal A from the boundary can be measured by observing a sectional view parallel to an extension direction of lead terminal A of the solid electrolytic capacitor. Such a sectional view has a distance defining the first side surface region, the distance being determined by a length of a center line of the side surface of lead terminal A. Then, a distance defining the first main surface region is determined by a length of a line drawn by the main surface of lead terminal A. Hereinafter, each distance from the boundary is interpreted in the same way.

The phase, "not covered with a low-melting-point material", means not only that the surface region is not covered with the same material as the low-melting-point material (also referred to below as "low-melting-point material A") covering at least a part of the main surface of the exposed part, but also that the exposed part is not covered with a low-melting-point material other than low-melting-point material A.

The side surface of the buried part can be conceptually divided into a first side surface region and a second side surface region that is the remainder other than the first side surface region. The first side surface region is a region away from the boundary between the buried part and the exposed part by more than 0.36 mm. The second side surface region is a region in less than or equal to 0.36 mm from the boundary between the buried part and the exposed part. The first side surface region and the second side surface region are continuous.

When condition A is satisfied, the low-melting-point material is allowed such that the second side surface region of the side surfaces of the buried part is covered with the low-melting-point material. Then, the region that can be covered with the low-melting-point material is desirably limited to a region in the second side surface region, the region having a distance from the boundary between the buried part and the exposed part, the distance being less than or equal to 0.25 mm. The second side surface region more desirably includes a region that is not covered with the low-melting-point material, the region having an area of more than or equal to 90% of an area of the second side surface region. The second side surface region is still more desirably not covered with the low-melting-point material at all.

When the first side surface region of the side surface of the buried part is covered with the low-melting-point material and the solid electrolytic capacitor is heated at a high temperature (e.g., when the solid electrolytic capacitor is mounted on a substrate), the low-melting-point material melts, and flows downward in a vertical direction on the side surface of the buried part and then segregates, and thus a void may be generated between the buried part and the exterior body. In contrast, when at least the first side surface region of the side surface of the buried part is not covered with the low-melting-point material, a void is less likely to be generated between the buried part and the exterior body. Even when a void is generated, the distance from the boundary between the buried part and the exposed part is limited to a range of less than or equal to 0.36 mm. Thus, the inside of the solid electrolytic capacitor and the external environment are less likely to communicate with each other, and thus deterioration of the solid electrolytic capacitor is suppressed. For example, deterioration of the conductive polymer contained in the solid electrolyte layer can be suppressed, and thus a decrease in electrostatic capacity can be suppressed. Additionally, an increase in ESR can be suppressed.

The main surface of the buried part can be conceptually divided into a first main surface region and a second main surface region that is the remainder other than the first main surface region. The first main surface region is a region away from the boundary between the buried part and the exposed part by more than 0.15 mm.

The second main surface region is a region in less than or equal to 0.15 mm from the boundary between the buried part and the exposed part. The first main surface region and the second main surface region are continuous.

When condition B is satisfied, the second main surface region of the main surface of the buried part is allowed to be covered with the low-melting-point material. Then, the region that can be covered with the low-melting-point material is desirably limited to a region in the second main surface region, the region having a distance from the boundary between the buried part and the exposed part, the distance being less than or equal to 0.1 mm, or less than or equal to 0.05 mm. The second main surface region more desirably includes a region that is not covered with the low-melting-point material, the region having an area of more than or equal to 90% of an area of the second main surface region. The second main surface region is still more desirably not covered with the low-melting-point material at all.

When the first main surface region of the main surface of the buried part is covered with the low-melting-point material and the solid electrolytic capacitor is heated at a high temperature (e.g., when the solid electrolytic capacitor is mounted on a substrate), the low-melting-point material melts, and a part of the fluidized low-melting-point material may segregate to a part of the buried part, the part being close to the exposed part. As a result, a void may be formed between the buried part and the exterior body. In contrast, when at least the first main surface region of the main surface of the buried part is not covered with the low-melting-point material, a void is less likely to be generated between the buried part and the exterior body. Even when a void is generated, the distance from the boundary between the buried part and the exposed part is limited to a range of less than or equal to 0.15 mm. Thus, the inside of the solid electrolytic capacitor and the external environment are less likely to communicate with each other, and thus deterioration of the solid electrolytic capacitor is suppressed.

On the side surface of the buried part, movement and segregation of the melted low-melting-point material are likely to be promoted by action of gravity. Thus, lead terminal A needs to satisfy at least condition A. In other words, even when only condition A is satisfied in lead terminal A, a corresponding improvement in heat resistance can be expected. However, lead terminal A desirably satisfies both condition A and condition B.

When at least one of the anode lead terminal or the cathode lead terminal includes at least a part of the main surface of the exposed part, the part being covered with the low-melting-point material, and condition A (preferably conditions A and B) is satisfied, a corresponding improvement in heat resistance can be expected. However, from the viewpoint of greatly improving the heat resistance, each of the anode lead terminal and the cathode lead terminal desirably includes at least a part of the main surface of the exposed part, the part being covered with a low-melting-point material, and condition A (preferably, conditions A and B) is desirably satisfied.

Solid electrolytic capacitors typically have a distance between an external environment and a cathode part that is shorter than a distance between the external environment and an anode part. Thus, when at least a part of the main surface of the exposed part of the cathode lead terminal is covered with the low-melting-point material, the cathode lead terminal desirably satisfies condition A (preferably both conditions A and B) from the viewpoint of more reliably achieving improvement in heat resistance.

Further, in lead terminal, a side surface of the exposed part may not be covered with the low-melting-point material. Designing the lead terminal in this manner enables an aspect in which the first side surface region and the second side surface region are not covered with the low-melting-point material to be more reliably and easily implemented.

Hereinafter, condition C is defined in which the side surface of the exposed part is not covered with the low-melting-point material. Although at least one of the anode lead terminal or the cathode lead terminal may satisfy condition C, from the viewpoint of more reliably achieving improvement in heat resistance, at least the cathode lead terminal desirably satisfies condition C, and both of the anode lead terminal and the cathode lead terminal may satisfy condition C.

Then, the main surface of the exposed part is divided into main surface A on a side connected to a connection electrode of a component such as a circuit board, and main surface B on an opposite side. The main surface A is only required to have an area of at least a part that is covered with the low-melting-point material. Although main surface B may not be covered with the low-melting-point material at all, main surface B may have an area of at least a part that is covered with the low-melting-point material.

Although a method for attaching the low-melting-point material to metal foil is not particularly limited, liquid phase methods such as electrolytic plating and electroless plating, and gas phase methods such as vapor deposition are available.

(Lead Terminal)

The lead terminal is also referred to as a lead frame or the like. Each of the anode lead terminal and the cathode lead terminal is only required to include a main surface and a side surface intersecting the main surface, and is not particularly limited in shape. The anode lead terminal and the cathode lead terminal are each formed by cutting out a starting material (generally metal foil) into a predetermined shape, for example. When the starting material is metal foil, main surfaces are derived from both front and back surfaces of the metal foil, and side surfaces are formed by cutting the metal foil into a predetermined shape.

The anode connection surface is provided on at least a main surface of the anode lead terminal. The cathode connection surface is provided on at least a main surface of the cathode lead terminal. The anode connection surface is electrically connected to the anode part by means such as physical contact, adhesion or bonding with a conductive adhesive or solder, or welding. The cathode connection surface may be electrically connected to the cathode part by means of physical contact, a conductive adhesive, welding, or the like. Examples of the physical contact include contact with deformation of the lead terminal due to pressure, such as swaging. The conductive adhesive is a mixture of a resin and conductive particles, for example. The resin may be a curable resin. The conductive particles may be carbon particles, metal particles, or the like.

The anode lead terminal includes apart close to the anode part, the part being buried in the exterior body together with the anode part. The cathode lead terminal includes a part close to the cathode part, the part being buried in the exterior body together with the cathode part. The remainder of each of the anode lead terminal and the cathode lead terminal is led out to the outside of the exterior body. Thus, each of the anode lead terminal and the cathode lead terminal includes a buried part buried in the exterior body and an exposed part exposed from the exterior body. The anode lead terminal and the cathode lead terminal each include the exposed part that functions as an external electrode for connecting the solid electrolytic capacitor to a connection electrode provided in a component such as a circuit board.

Although the starting material of the lead terminal (and the material of the lead terminal after being formed as the lead terminal) is not particularly limited as long as it is electrochemically and chemically stable and has conductivity, metal foil is generally used. The lead terminal has a thickness (distance between main surfaces of the metal foil) in a range from 25 µm to 200 µm, inclusive, or from 25 µm to 100 µm, inclusive, for example, from the viewpoint of height reduction.

The lead terminal satisfying condition C above is obtained, for example, by attaching a low-melting-point material to a starting material (generally metal foil) of the lead terminal with the buried part shielded by a shielding material such as a masking tape, and then cutting out the starting material into a predetermined shape. In other words, the lead terminal satisfying condition C is obtained by a method for forming side surfaces of the buried part and the exposed part after the low-melting-point material is attached to the starting material (generally metal foil) of the lead terminal.

At least one main surface of each of the anode lead terminal and the cathode lead terminal may be roughened. As a result, adhesion between the lead terminal and the exterior body is improved, and the inside of the solid electrolytic capacitor is further less likely to communicate with the external environment.

The main surface roughened (rough surface) may be provided on at least a part of at least one main surface of the buried part of each of the anode lead terminal and the cathode lead terminal. The rough surface may have an area with a ratio of more than or equal to 50%, 80%, or 90% to a total area of the main surface of the buried part, for example. The rough surface may be formed extending from the buried part to the exposed part to be also formed on at least a part of the main surface of the exposed part.

The roughening may be performed by a sand blasting method, a roughening plating method, or a roughening etching method, for example. The sand blasting method is preferable in that quick processing can be performed and cost performance is excellent. The roughening plating method is preferable from the viewpoint of low cost. The roughening etching method is preferable in that unevenness is small and fine roughness can be formed.

Additionally, unlike the sand blasting method, the roughening plating method and the roughening etching method have an advantage that beads (shot media) do not remain.

The main surface roughened (rough surface) may have a developed interface area ratio (Sdr) of more than or equal to 0.4, for example. Here, the developed interface area ratio is a parameter measured in accordance with ISO 25178. Setting the Sdr to more than or equal to 0.4 further improves the adhesion between the lead terminal and the exterior body, and thus the inside of the solid electrolytic capacitor is further less likely to communicate with the external environment.

Although the developed interface area ratio is not particularly limited, the developed interface area ratio set to less than or equal to a predetermined value enables facilitating manufacture of the lead terminal. The rough surface may have a developed interface area ratio of less than or equal to 10.0, 6.0, 4.0, 2.0, 1.0, or 0.6. The developed interface area ratio may be in a range from 0.4 to 10.0, inclusive, from 0.4 to 6.0, inclusive, from 0.4 to 4.0, inclusive, from 0.4 to 2.0, inclusive, from 0.4 to 1.0, inclusive, or from 0.4 to 0.6, inclusive.

The sand blasting method enables the rough surface to have a developed area ratio increased to more than or equal to 0.4 by reducing particles (shot media) in particle size (e.g., increase in count), for example. Increasing the number of shots of sand blasting also enables increasing the developed interface area ratio of the rough surface subjected to the sand blasting. The particles (shot media) used for sand blasting are not particularly limited, and alumina particles or garnet particles may be used.

When the rough surface is formed by the roughening plating method, the Sdr can be increased to more than or equal to 0.4 by forming needle-like or particulate plating to increase a surface area, for example. For example, a proportion of the needle-like or particulate plating may be increased.

When the rough surface is formed by the roughening etching method, for example, a surface area can be increased by forming a roughened shape by using a difference between an etching rate of crystal grain boundaries and an etching rate of crystal grains (crystal grain boundaries have a high etching rate). As a result, the Sdr can be increased to more than or equal to 0.4. For example, metal constituting the starting material of the lead terminal may be selected to change a ratio between the crystal grain boundaries and the crystal grains in the metal, or a difference in the etching rate may be changed by changing an etching condition.

(Low-Melting-Point Material)

The low-melting-point material widely includes a material that melts by heating when the solid electrolytic capacitor is incorporated into any device as a component (e.g., when the solid electrolytic capacitor is mounted on a substrate). A melting point of the low-melting-point material may be in a range from 180° C. to 240° C., inclusive, for example. The low-melting-point material covering at least a part of the main surface of the exposed part melts when a connection electrode provided in a component such as a circuit board is connected to the exposed part (external electrode), and thus contributes to the connection of both of them.

The low-melting-point material may contains tin (Sn) or a solder. In this case, at least a part of the exposed part, the part serving as an external electrode, is bonded to the connection electrode using the tin or the solder. Bonding using such a metal material is strong.

Examples of the solder include materials specified in JIS Z 3282-1999. Specifically, the examples include lead-containing solder such as Sn—Pb-based solder, Pb—Sn-based solder, Sn—Pb—Sb-based solder, Sn—Pb—Bi-based solder, Sn—Pb—Cd-based solder, Sn—Pb—Cu-based solder, Sn—Pb—Ag-based solder, Pb—Ag-based solder, or Pb—Ag—Sn-based solder, and lead-free solder such as Sn—Sb-based solder, Sn—Bi-based solder, Sn—Cu-based solder, Sn—Cu—Ag-based solder, Sn—In-based solder, Sn—In—Ag—Bi-based solder, Sn—Ag-based solder, Sn—Ag—Cu-based solder, Sn—Ag—Bi—Cu-based solder, Sn—Zn-based solder, or Sn—Bi—Zn-based solder.

The low-melting-point material is applied to at least the exposed part of the lead terminal as a layer or a film having a thickness in a range from 5 μm to 20 μm, inclusive, for example. When the low-melting-point material is Sn or a solder, for example, a plating layer of the low-melting-point material having the above thickness may be formed on at least the exposed part of the lead terminal. The thickness of the low-melting-point material on the main surface of the exposed part may be obtained as an average value of numerical values measured at any five points, for example.

(Exterior Body)

The exterior body seals the capacitor element, the buried part of the anode lead terminal, and the buried part of the cathode lead terminal to prevent the capacitor element from being exposed to the outside. The exterior body further insulates the anode lead terminal from the cathode lead terminal. Known materials and configurations used for the solid electrolytic capacitor may be applied to the exterior body. The exterior body may be formed using an insulating thermosetting resin composition, for example. The thermosetting resin composition contains a thermosetting resin and may contain an additive agent. As the additive agent, an inorganic filler or the like may be contained. Examples of the thermosetting resin include an epoxy resin, phenol resin, silicone resin, melamine resin, urea resin, alkyd resin, polyurethane, polyimide, and unsaturated polyester. The thermosetting resin composition is formed by a molding means such as a transfer molding method while sealing the capacitor element, the buried part of the anode lead terminal, and the buried part of the cathode lead terminal.

(Capacitor Element)

The capacitor element includes the anode part and the cathode part. Between the anode part and the cathode part, a dielectric layer is interposed. The anode part includes an anode body. The cathode part is provided covering the dielectric layer formed on at least a part of a surface of the anode body.

The anode body includes metal foil containing a valve metal or a porous sintered body containing a valve metal. The anode body including the metal foil has a sheet shape or a flat plate shape, for example. The metal foil has a surface that is typically roughened. Although the anode body including the porous sintered body is not particularly limited in shape, the anode body is generally rectangular or prismatic. The anode body including the porous sintered body may include an anode wire planted in the porous sintered body. The anode wire is used for connection to the anode lead terminal. The anode body including the metal foil is not particularly limited in thickness, but has a thickness in a range from 15 μm to 300 μm, inclusive, for example. The anode body including the porous sintered body is not particularly limited in thickness, but has a thickness in a range from 15 μm to 5 mm, inclusive, for example.

Examples of the valve metal include aluminum, tantalum, titanium, and niobium. The anode body may contain one or more kinds of valve metals.

(Dielectric Layer)

The dielectric layer is formed by anodizing the surface of the anode body by anodizing treatment, for example. Thus, the dielectric layer may contain an oxide of a valve metal. When aluminum is used as the valve metal, for example, the dielectric layer can contain $Al_2O_3$. Then, the dielectric layer is not particularly limited in material as long as the dielectric layer is made of a material functioning as a dielectric material.

(Cathode Part)

The cathode part includes a solid electrolyte layer covering at least a part of the dielectric layer, and a cathode lead-out layer covering at least a part of the solid electrolyte layer, for example. The solid electrolyte layer can be made of a manganese compound, or a conductive polymer, for example.

Available examples of the conductive polymer include polypyrrole, polyaniline, polythiophene, polyacetylene, and derivatives thereof. The solid electrolyte layer containing the conductive polymer can be formed by performing chemical polymerization and/or electrolytic polymerization on a raw material monomer on the dielectric layer, for example.

Alternatively, the dielectric layer can be formed by applying a solution in which the conductive polymer is dissolved or a dispersion liquid in which the conductive polymer is dispersed to the dielectric layer.

The cathode lead-out layer is formed covering at least a part of the solid electrolyte layer. The cathode lead-out layer includes a carbon layer and a metal paste layer (e.g., a silver paste layer) formed on a surface of the carbon layer, for example. The carbon layer is composed of a composition containing a conductive carbon material such as graphite. The metal paste layer is composed of a composition containing silver particles and a binder resin, for example. Then, the cathode lead-out layer is not particularly limited in configuration as long as the cathode lead-out layer has a current collecting function.

Hereinafter, an example of the solid electrolytic capacitor according to the present disclosure will be specifically described with reference to the drawings. The above-described components can be applied to components of an electrolytic capacitor as an example described below. The components of the electrolytic capacitor as the example described below can be changed based on the above description. Then, a matter described below may be applied to the exemplary embodiment described above. The exemplary embodiment described below may exclude components that are not essential to the electrolytic capacitor of the present disclosure.

The buried part of the cathode lead terminal may include a guide part that rises from the cathode connection surface to regulate a position of the capacitor element. For example, at least one guide part may be provided from each of opposite ends of the cathode connection surface in a direction orthogonal to a direction from the anode lead terminal toward the cathode lead terminal.

When the solid electrolytic capacitor includes multiple capacitor elements stacked, the buried part may include an element mounting part adjacent to one outermost capacitor element of the capacitor elements in at least one of the anode lead terminal or the cathode lead terminal. In this case, the guide part may be provided rising from only one of sides of the buried part, the sides being close to corresponding main surfaces A and B, and the capacitor element being mounted on the only one of the sides.

Figure 1:
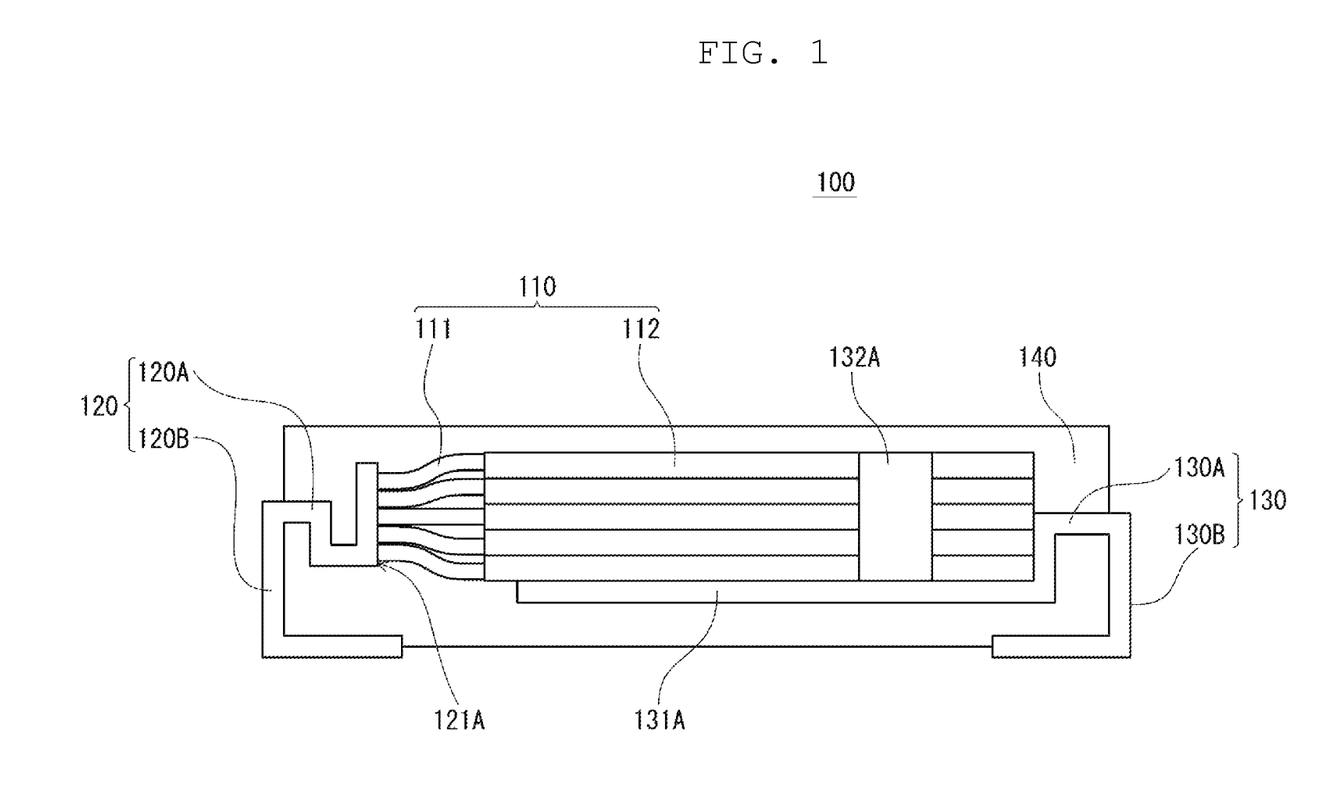
FIG. 1 is a sectional view schematically illustrating a configuration of an example of a solid electrolytic capacitor according to the present disclosure.

FIG. 1 is a sectional view schematically illustrating a configuration of an example of solid electrolytic capacitor 100 according to the present disclosure. Solid electrolytic capacitor 100 includes at least one capacitor element 110 including anode part 111 and cathode part 112, anode lead terminal 120 including anode connection surface 121A electrically connected to anode part 111, cathode lead terminal 130 including a cathode connection surface electrically connected to cathode part 112, and exterior body 140 covering capacitor element 110. Cathode lead terminal 130 includes element mounting part 131A adjacent to the one outermost capacitor of the capacitor elements.

Solid electrolytic capacitor 100 includes multiple capacitor elements 110 stacked. Anode part 111 includes an anode body including metal foil with a surface roughened, and the metal foil contains a valve metal. Thus, anode part 111 has a sheet shape or a flat plate shape.

Anode lead terminal 120 and cathode lead terminal 130 each include a main surface including corresponding one of anode connection surface 121A and the cathode connection surface, and a side surface intersecting the main surface. Anode lead terminal 120 includes buried part 120A buried in exterior body 140 and exposed part 120B exposed from exterior body 140. Cathode lead terminal 130 includes buried part 130A buried in exterior body 140 and exposed part 130B exposed from exterior body 140. Anode lead terminal 120 and cathode lead terminal 130 are led out to the outside from corresponding side surfaces of the solid electrolytic capacitor.

The exposed part of at least one of anode lead terminal 120 or cathode lead terminal 130 includes a main surface covered with a low-melting-point material.

Buried part 130A of cathode lead terminal 130 includes element mounting part 131A adjacent to one outermost capacitor element of capacitor elements 110. At least a part of element mounting part 131A serves as a cathode connection surface. Element mounting part 131A includes guide part 132A that rises from the cathode connection surface to regulate positions of capacitor elements 110.

Anode connection surface 121A of buried part 120A of anode lead terminal 120 is connected to anode part 111 by welding, for example. The cathode connection surface (element mounting part 131A) of buried part 130A of cathode lead terminal 130 is connected to cathode part 112 using a conductive adhesive, for example.

One guide part 132A is provided at each of opposite ends of the cathode connection surface in the direction orthogonal to the direction from anode lead terminal 120 toward cathode lead terminal 130. Guide part 132A is provided rising from only one main surface on which capacitor element 110 is mounted.

FIG. 2 is a perspective view schematically illustrating structure of a main part of solid electrolytic capacitor 100 illustrated in FIG. 1. FIG. 3 includes plan view (A) and side view (B) that schematically illustrate cathode lead terminal 130 in a main part of solid electrolytic capacitor 100 illustrated in FIG. 2. FIG. 2 illustrates buried part 130A of cathode lead terminal 130 buried in exterior body 140 with a broken line.

The side surface of buried part 130A of cathode lead terminal 130 is divided into first side surface region 133A that is away from boundary 130C between buried part 130A and exposed part 130B by more than 0.36 mm, and second side surface region 134A that is in less than or equal to 0.36 mm from boundary 130C.

The main surface of buried part 130A of cathode lead terminal 130 is divided into first main surface region 135A that is away from boundary 130C between buried part 130A and exposed part 130B by more than 0.15 mm, and second main surface region 136A that is in less than or equal to 0.15 mm from boundary 130C.

Although only first side surface region 133A is required to be covered with no low-melting-point material, first side surface region 133A and first main surface region 135A are each preferably covered with no low-melting-point material.

Although second side surface region 134A and second main surface region 136A are each allowed to be covered with the low-melting-point material, from the viewpoint of reliably improving heat resistance of the solid electrolytic capacitor, at least one of second side surface region 134A or second main surface region 136A is preferably not covered with the low-melting-point material, and each of second side surface region 134A and second main surface region 136A is more preferably not covered with the low-melting-point material.

Although side surface 137B of exposed part 130B of cathode lead terminal 130 is allowed to be covered with the low-melting-point material, side surface 137B is preferably not covered with the low-melting-point material. This configuration enables the heat resistance of the solid electrolytic capacitor to be more reliably improved.

Main surface 138B of exposed part 130B of cathode lead terminal 130 is only required to include a region covered with the low-melting-point material, the region being connected to a connection electrode on at least the main surface on which the connection electrode is connected to a connection electrode of a component such as a circuit board. From the viewpoint of easy mounting on a substrate and firm bonding to the connection electrode, main surface 138B preferably has a region covered with the low-melting-point material, the region having an area of more than or equal to 90% (e.g., 100%) of an area of main surface 138B.

When the solid electrolytic capacitor includes multiple capacitor elements stacked, the buried part may include a sandwiched part interposed between two first and second elements adjacent to each other and selected from the multiple capacitor elements in at least one of the anode lead terminal or the cathode lead terminal.

In this case, the guide part may be provided rising from each of sides of the buried part, the sides being close to corresponding main surfaces A and B.

Figure 4:
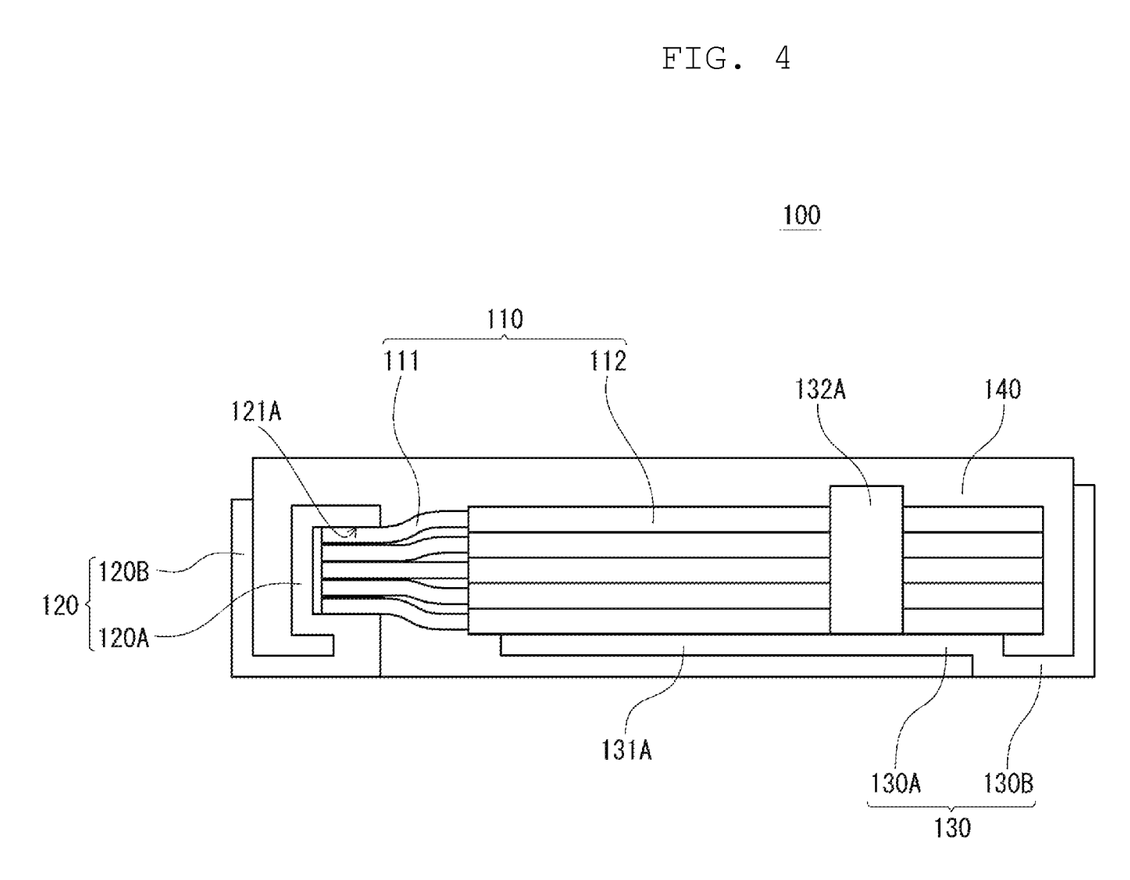
FIG. 4 is a sectional view schematically illustrating a configuration of another example of the solid electrolytic capacitor according to the present disclosure.

FIG. 4 is a sectional view illustrating a configuration of another solid electrolytic capacitor 100A according to the present disclosure. Solid electrolytic capacitor 100A includes capacitor element 110 as in solid electrolytic capacitor 100. Then, anode lead terminal 120 and cathode lead terminal 130 are different in structure from those of solid electrolytic capacitor 100. Anode lead terminal 120 includes buried part 120A with anode connection surface 121A that is electrically connected to anode part 111 by physical contact. Here, anode parts 111 of multiple capacitor elements are inserted into a part of buried part 120A of anode lead terminal 120 and swaged to anode connection surface 121A. Anode lead terminal 120 and cathode lead terminal 130 are each led out from a bottom surface (lower side in FIG. 4) of the solid electrolytic capacitor.

Figure 5:
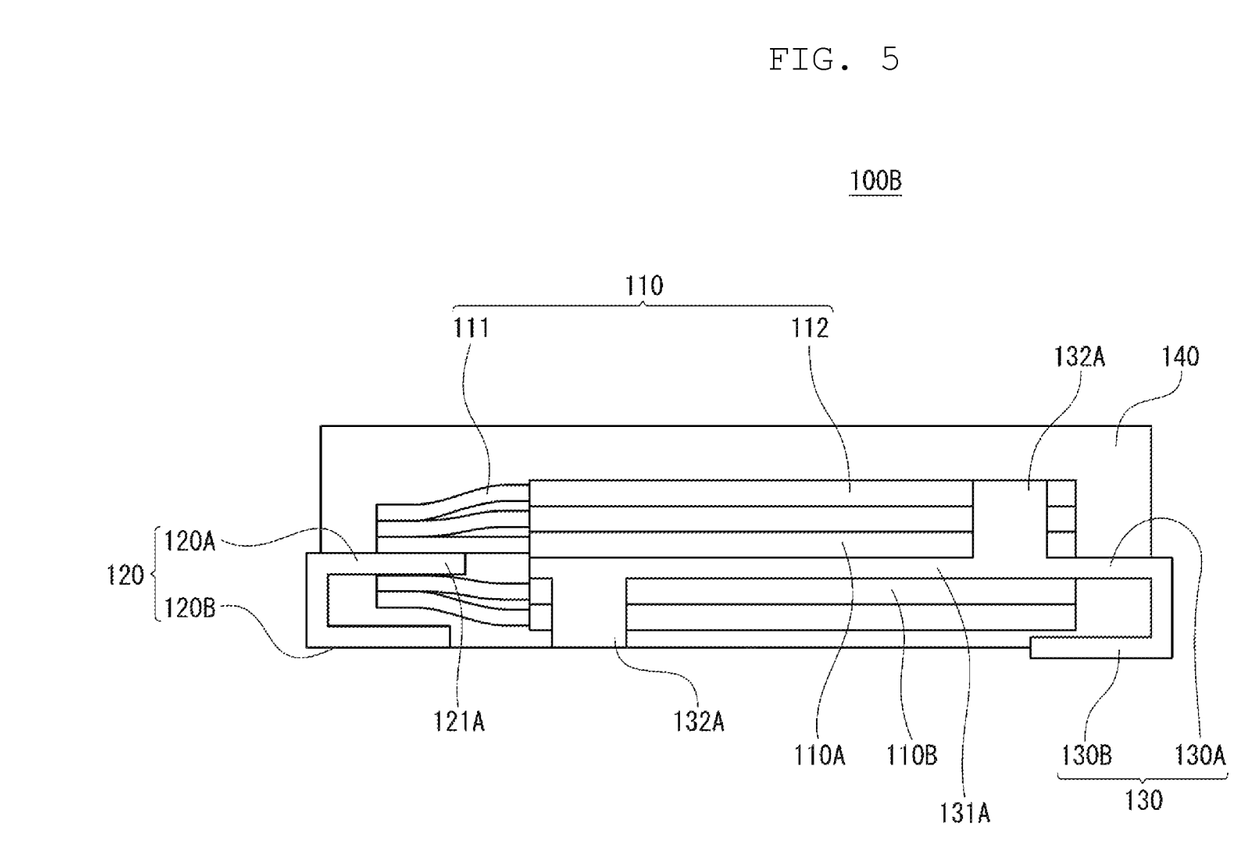
FIG. 5 is a sectional view schematically illustrating a configuration of still another example of the solid electrolytic capacitor according to the present disclosure.

FIG. 5 is a sectional view illustrating a configuration of still another solid electrolytic capacitor 100B according to the present disclosure. Solid electrolytic capacitor 100B includes capacitor element 110 as in solid electrolytic capacitor 100. Then, anode lead terminal 120 and cathode lead terminal 130 are different in structure from those of solid electrolytic capacitor 100. Anode lead terminal 120 includes buried part 120A provided with sandwiched part 121A interposed between two first element 110A and second element 110B adjacent to each other selected from multiple capacitor elements. Cathode lead terminal 130 includes buried part 130A provided with sandwiched part 131A interposed between first element 110A and second element 110B.

At least apart of sandwiched part 121A serves as an anode connection surface. The anode connection surface (sandwiched part 121A) is connected to anode part 111 by welding, for example. At least a part of sandwiched part 131A serves as a cathode connection surface. The cathode connection surface (sandwiched part 131A) is connected to cathode part 112 using a conductive adhesive, for example.

One guide part 132A is provided at each of opposite ends of the cathode connection surface in the direction orthogonal to the direction from anode lead terminal 120 toward cathode lead terminal 130. Guide parts 132A are provided rising toward respective main surfaces (main surface A and main surface B) from the corresponding surfaces on each of which capacitor element 110 is mounted.

EXAMPLES

Although the present disclosure will be specifically described below based on Examples and Comparative Examples, the present disclosure is not limited to Examples below.

Examples 1, 2 and Comparative Examples 1, 2

A solid electrolytic capacitor including a stacked body with six capacitor elements stacked was produced in the following manner.
(1) Production of Capacitor Element Aluminum foil (with a thickness of 100 μm) was prepared as a base material, and a surface of the aluminum foil was subjected to etching treatment to obtain an anode body including porous parts (with a thickness of 35 μm on one main surface of the aluminum foil, and with a thickness of 35 μm on the other main surface of the aluminum foil). The anode body was immersed in a phosphoric acid solution (liquid temperature: 70° C.) having a concentration of 0.3% by mass, and a direct-current voltage of 10 V was applied for 20 minutes to form a dielectric layer containing aluminum oxide ($Al_2O_3$) on a surface of the anode body.

The anode body was divided into an anode part, a cathode formation part, and a separator between the anode part and the cathode formation part, and a thin-thickness part (thickness: 35 μm) was formed by compressing a part of the separator by press working. An insulating resist tape (separating member) was attached to the thin-thickness part.

The anode body on which the dielectric layer was formed was immersed in a liquid composition containing a conductive material to form a precoat layer.

A polymerization liquid containing pyrrole (monomer of a conductive polymer), naphthalenesulfonic acid (dopant), and water was prepared. The anode body on which the dielectric layer and the precoat layer were formed was immersed in the obtained polymerization liquid, and electrolytic polymerization was performed at an applied voltage of 3 V to form a solid electrolyte layer.

A dispersion liquid in which graphite particles were dispersed in water was applied to the solid electrolyte layer and then dried to form a carbon layer on the surface of the solid electrolyte layer. Next, a silver paste containing silver particles and a binder resin (epoxy resin) was applied onto the surface of the carbon layer, and then the binder resin was cured by heating to form a metal paste layer (silver paste layer, thickness 15 μm). In this way, a cathode lead-out layer composed of the carbon layer and the metal paste layer was formed to obtain a capacitor element.

Six capacitor elements obtained were stacked with conductive pastes interposed between corresponding capacitor elements, and their anode parts were joined to each other by laser welding to obtain a stacked body.
(2) Anode Lead Terminal and Cathode Lead Terminal Copper foil (with a thickness of 100 μm) for forming an anode lead terminal and a cathode lead terminal was prepared. Next, the copper foil was processed into a lead frame having a predetermined shape. Here, the lead frame refers to the copper foil processed before it is divided into lead terminals. The lead frame is an assembly of anode lead terminals and cathode lead terminals of multiple solid electrolytic capacitors. In a buried part of the cathode lead terminal, an element mounting part was formed on which the stacked body was mounted, the element mounting part being adjacent to one outermost capacitor element of the capacitor elements.

A part of the lead frame to be a buried part of the anode lead terminal and a part of the lead frame to be the buried part of the cathode lead terminal were shielded with a masking tape. Then, a Sn plating layer (thickness: 10 μm) as a layer made of a low-melting-point material was formed on each of parts of the lead frame to be exposed parts of the anode lead terminal and the cathode lead terminal. At that time, not only a main surface but also a side surface of the buried part was strictly masked in the part to be the buried part of the anode lead terminal to prevent the Sn plating from entering a second side surface region. In contrast, the part to be the buried part of the cathode lead terminal was subjected to normal masking without strictly masking a side surface of the buried part. Table 1 shows distances (Cd1, Cd2) by which the Sn plating entered the buried part from a boundary between the buried part and the exposed part of the cathode lead terminal. Next, the parts to be the buried parts of the anode lead terminal and the cathode lead terminal were roughened by a sand blasting method. The parts to be the exposed parts of the anode lead terminal and the cathode lead terminal were not roughened. The rough surface formed had a developed interface area ratio Sdr of 0.4 that was measured in accordance with ISO 25178.

Each table shows each symbol that indicates the following. Each distance was measured by electron microscope observation of a section of the solid electrolytic capacitor. Each Table shows negative values of Cd1, Cd2, Ad1, and Ad2 each of which indicates a distance from a boundary between the buried part and the exposed part to Sn covering the exposed part because Sn does not reach the boundary.

Cd1: Penetration distance of Sn from the boundary between the buried part and the exposed part on the main surface of the buried part of the cathode lead terminal Cd2: Penetration distance of Sn from the boundary between the buried part and the exposed part on the side surface of the buried part of the cathode lead terminal Ad1: Penetration distance of Sn from the boundary between the buried part and the exposed part on the main surface of the buried part of the anode lead terminal Ad2: Penetration distance of Sn from the boundary between the buried part and the exposed part on the side surface of the buried part of the anode lead terminal Sdr: Developed interface area ratio Rhm: Airtight failure rate Resr: ESR failure rate (3) Assembly of Solid Electrolytic Capacitor The stacked body of the capacitor elements was connected to the element mounting part of the buried part of the cathode lead terminal. At that time, a conductive paste was interposed between one cathode part of the capacitor element disposed on the outermost side of the stacked body and the cathode connection surface of the element mounting part. Then, the anode lead terminal was connected to the anode part of the stacked body of the capacitor elements.

Next, the capacitor elements, the buried part of the anode lead terminal, and the buried part of the cathode lead terminal were sealed by transfer molding. In this way, 100 pieces of each of solid electrolytic capacitors A1, A2, B1, B2 (rated voltage: 2.5 V) of the type generally illustrated in FIG. 1 were prepared.

[Evaluation]

(1) Airtight Failure Rate

The solid electrolytic capacitors A1, A2, B1, B2 were heated under the same temperature conditions as in the reflow treatment according to IPC/JEDEC J-STD-020D (heated at a maximum temperature of 260° C. for 30 seconds).

After that, airtightness was evaluated by a gross leak test. Then, a capacitor with a pressure change larger than a predetermined value was determined as airtight failure, and a failure rate (%) was obtained. Results are shown in Table 1.

(2) ESR Failure Rate

An initial ESR value X0 (mΩ) at a frequency of 100 kHz of each of the solid electrolytic capacitors A1, A2, B1, B2 was measured under an environment of 20° C. using an LCR meter for 4-terminal measurement. Next, a rated voltage was applied to each of the solid electrolytic capacitors at a temperature of 125° C. for 1000 hours (reliability test). After that, the ESR value (X1) (mΩ) was measured by the method similar to the above. Then, the solid electrolytic capacitor having the ESR value (X1) that is twice or more the initial ESR value (X0) was determined as failure, and a failure rate (%) was obtained. Results are shown in Table 1.

TABLE 1

|    | Cd1      | Cd2     | Sdr | Rhm (%) | Resr (%) |
|----|----------|---------|-----|---------|----------|
| A1 | −0.1 mm  | 0.25 mm | 0.4 | 0%      | 0%       |
| A2 | −0.1 mm  | 0.36 mm | 0.4 | 0%      | 0%       |
| B1 | −0.1 mm  | 0.44 mm | 0.4 | 8%      | 4%       |
| B2 | 0 mm     | 0.40 mm | 0.4 | 6%      | 4%       |

Examples 3 to 5

A part to be a buried part of a cathode lead terminal was strictly masked on both a main surface and a side surface, and Cd1 and Cd2 were set as shown in Table 2. Then, solid electrolytic capacitor A5 of Example 5 had a development area ratio Sdr of 0.6 of a lead terminal by changing conditions of the sand blasting method. Except for the above, solid electrolytic capacitors A3 to A5 were prepared and evaluated in the same manner as in Example 1. Results are shown in Table 2.

TABLE 2

|    | Cd1      | Cd2      | Sdr | Rhm (%) | Resr (%) |
|----|----------|----------|-----|---------|----------|
| A3 | −0.1 mm  | −0.1 mm  | 0.4 | 0%      | 0%       |
| A4 | 0 mm     | 0 mm     | 0.4 | 0%      | 0%       |
| A5 | 0 mm     | 0 mm     | 0.6 | 0%      | 0%       |

Examples 6 to 8

A lead frame was produced in which a part to be a buried part of an anode lead terminal and a part to be a buried part of a cathode lead terminal were shielded with a masking tape before copper foil was processed into the lead frame having a predetermined shape, and then a Sn plating layer was formed on a part to be an exposed part of each of the anode lead terminal and the cathode lead terminal. After that, the copper foil was processed into the lead frame having the predetermined shape. Each of the part to be the buried part of the anode lead terminal and the part to be the buried part of the cathode lead terminal had a side surface being a cut surface formed after the Sn plating layer was formed on the copper foil, and thus the side surface was not covered with Sn at all. Except for the above, solid electrolytic capacitors A6 to A8 were prepared and evaluated in the same manner as in Examples 3 to 5. Results are shown in Table 3.

TABLE 3

|    | Cd1      | Cd2   | Sdr | Rhm (%) | Resr (%) |
|----|----------|-------|-----|---------|----------|
| A6 | −0.1 mm  | 0 mm  | 0.4 | 0%      | 0%       |
| A7 | 0 mm     | 0 mm  | 0.4 | 0%      | 0%       |
| A8 | 0 mm     | 0 mm  | 0.6 | 0%      | 0%       |

Examples 9, 10 and Comparative Example 3 to 5

Comparative Examples 3, 4 each had a part to be a buried part of a cathode lead terminal, the part being subjected to normal masking without strictly masking a side surface, and Cd1 and Cd2 were changed as shown in Table 4.

In contrast, Examples 9, 10 and Comparative Example 5 each had a part to be a buried part of a cathode lead terminal, the part being subjected to strict masking on not only its main surface but also its side surface, and Cd1 and Cd2 were changed as shown in Table 4.

Except for the above, solid electrolytic capacitors A9, A10, B3 to B5 were prepared and evaluated in the same manner as in Example 1. Results are shown in Table 4.

TABLE 4

|     | Cd1     | Cd2     | Sdr | Rhm (%) | Resr (%) |
|-----|---------|---------|-----|---------|----------|
| B3  | 0.05 mm | 0.52 mm | 0.4 | 7%      | 6%       |
| B4  | 0.10 mm | 0.73 mm | 0.4 | 16%     | 15%      |
| A9  | 0.15 mm | 0.15 mm | 0.4 | 0%      | 0%       |
| A10 | 0.20 mm | 0.20 mm | 0.4 | 5%      | 3%       |
| B5  | 0.39 mm | 0.39 mm | 0.6 | 11%     | 9%       |

Example 11 and Comparative Example 6

As shown in Table 5, Cd1 and Cd2 were changed. Additionally, solid electrolytic capacitor B6 of Comparative Example 6 had a development area ratio Sdr of 0.3 of a lead terminal by changing the conditions of the sand blasting method.

Except for the above, solid electrolytic capacitors A11, B6 were prepared and evaluated in the same manner as in Example 6. Results are shown in Table 5.

TABLE 5

|  | Cd1 | Cd2 | Sdr | Rhm (%) | Resr (%) |
|---|---|---|---|---|---|
| A11 | 0.15 mm | 0 mm | 0.4 | 0% | 0% |
| B6 | 0.1 mm | 0.73 mm | 0.3 | 23% | 21% |

Examples 12, 13 and Comparative Examples 7, 8

Contrary to Examples 1, 2 and Comparative Examples 1, 2, not only a main surface but also a side surface of a buried part was strictly masked in a part to be the buried part of a cathode lead terminal to prevent the Sn plating from entering a second side surface region. In contrast, a part to be a buried part of an anode lead terminal was subjected to normal masking without strictly masking a side surface of the buried part. Except for the above, solid electrolytic capacitors A12, A13, and B7, B8 were produced and evaluated in the same manner as in Examples 1, 2 and Comparative Examples 1, 2. Results are shown in Table 6.

TABLE 6

|  | Ad1 | Ad2 | Sdr | Rhm (%) | Resr (%) |
|---|---|---|---|---|---|
| A12 | −0.1 mm | 0.24 mm | 0.4 | 0% | 0% |
| A13 | −0.1 mm | 0.36 mm | 0.4 | 0% | 0% |
| B7 | −0.1 mm | 0.42 mm | 0.4 | 6% | 4% |
| B8 | 0 mm | 0.43 mm | 0.4 | 5% | 4% |

Examples 14 to 16

A part to be a buried part of an anode lead terminal was strictly masked on both a main surface and a side surface, and Ad1 and Ad2 were set as shown in Table 7. Then, solid electrolytic capacitor A16 of Example 16 had a development area ratio Sdr of 0.6 of a lead terminal by changing conditions of the sand blasting method. Except for the above, solid electrolytic capacitors A14 to A16 were prepared and evaluated in the same manner as in Example A12. Results are shown in Table 7.

TABLE 7

|  | Ad1 | Ad2 | Sdr | Rhm (%) | Resr (%) |
|---|---|---|---|---|---|
| A14 | −0.1 mm | −0.1 mm | 0.4 | 0% | 0% |
| A15 | 0 mm | 0 mm | 0.4 | 0% | 0% |
| A16 | 0 mm | 0 mm | 0.6 | 0% | 0% |

Examples 17 to 19

A lead frame was produced in which a part to be a buried part of an anode lead terminal and a part to be a buried part of a cathode lead terminal were shielded with a masking tape before copper foil was processed into the lead frame having a predetermined shape, and then a Sn plating layer was formed on a part to be an exposed part of each of the anode lead terminal and the cathode lead terminal, and then the copper foil was processed into the lead frame having a predetermined shape. Except for the above, solid electrolytic capacitors A17 to A19 were prepared and evaluated in the same manner as in Examples 14 to 16. Results are shown in Table 8.

TABLE 8

|  | Ad1 | Ad2 | Sdr | Rhm (%) | Resr (%) |
|---|---|---|---|---|---|
| A17 | −0.1 mm | 0 mm | 0.4 | 0% | 0% |
| A18 | 0 mm | 0 mm | 0.4 | 0% | 0% |
| A19 | 0 mm | 0 mm | 0.6 | 0% | 0% |

Examples 20, 21 and Comparative Example 9 to 10

Comparative Examples 9, 10 each had a part to be a buried part of an anode lead terminal, the part being subjected to normal masking without strictly masking a side surface, and Ad1 and Ad2 were changed as shown in Table 9.

In contrast, Examples 20, 21 each had a part to be a buried part of an anode lead terminal, the part being subjected to strict masking on not only its main surface but also its side surface, and Ad and Ad2 were changed as shown in Table 9.

Except for the above, solid electrolytic capacitors A20, A21, B9, B10 were prepared and evaluated in the same manner as in Example 11. Results are shown in Table 9.

TABLE 9

|  | Ad1 | Ad2 | Sdr | Rhm (%) | Resr (%) |
|---|---|---|---|---|---|
| B9 | 0.05 mm | 0.48 mm | 0.4 | 7% | 6% |
| B10 | 0.10 mm | 0.71 mm | 0.4 | 16% | 15% |
| A20 | 0.15 mm | 0.16 mm | 0.4 | 0% | 0% |
| A21 | 0.20 mm | 0.22 mm | 0.4 | 5% | 3% |

Example 22 and Comparative Example 11

As shown in Table 10, Ad1 and Ad2 were changed. Additionally, solid electrolytic capacitor B11 of Comparative Example 11 had a development area ratio Sdr of 0.3 of a lead terminal by changing the conditions of the sand blasting method. Except for the above, solid electrolytic capacitors A22, B11 were prepared and evaluated in the same manner as in Example 17. Results are shown in Table 10.

TABLE 10

|  | Ad1 | Ad2 | Sdr | Rhm (%) | Resr (%) |
|---|---|---|---|---|---|
| A22 | 0.15 mm | 0 mm | 0.4 | 0% | 0% |
| B11 | 0.1 mm | 0.71 mm | 0.3 | 21% | 20% |

The solid electrolytic capacitor according to the present disclosure has high heat resistance, and even when the solid electrolytic capacitor is exposed to a high temperature, the inside of the solid electrolytic capacitor is less likely to communicate with the external environment. Thus, deterioration of the solid electrolyte layer is suppressed, so that the solid electrolytic capacitor can be used for various applications requiring heat resistance.

The invention claimed is:

1. A solid electrolytic capacitor comprising:
   at least one capacitor element including an anode part and a cathode part;
   an anode lead terminal having an anode connection surface electrically connected to the anode part;
   a cathode lead terminal having a cathode connection surface electrically connected to the cathode part; and
   an exterior body covering the at least one capacitor element, wherein:
   each of the anode lead terminal and the cathode lead terminal has a main surface and a side surface intersecting the main surface, and includes a buried part buried in the exterior body and an exposed part exposed from the exterior body,
   the main surface of the anode lead terminal includes the anode connection surface, and the main surface of the cathode lead terminal includes the cathode connection surface,
   in at least one lead terminal selected from the anode lead terminal or the cathode lead terminal, at least a part of the main surface of the exposed part is covered with a low-melting-point material,
   in the side surface of the buried part, a first side surface region is not covered with the low-melting-point material, the first side surface region being a region away from a boundary between the buried part and the exposed part by more than 0.36 mm, and
   in a main surface of the buried part:
   a first main surface region is not covered with the low-melting-point material, the first main surface region being a region away from the boundary between the buried part and the exposed part by more than 0.15 mm; and
   at least a part of a second main surface region is covered with the low-melting-point material, the second main surface region being a region in less than or equal to 0.15 mm from the boundary between the buried part and the exposed part.

2. The solid electrolytic capacitor according to claim 1, wherein in the at least one lead terminal, the side surface of the exposed part is not covered with the low-melting-point material.

3. The solid electrolytic capacitor according to claim 1, wherein the main surface of the at least one lead terminal is roughened.

4. The solid electrolytic capacitor according to claim 3, wherein a developed interface area ratio of the main surface roughened is more than or equal to 0.4.

5. The solid electrolytic capacitor according to claim 1, wherein a melting point of the low-melting-point material is in a range from 180° C. to 240° C., inclusive.

6. The solid electrolytic capacitor according to claim 1, wherein the low-melting-point material is tin or a solder.

7. The solid electrolytic capacitor according to claim 1, wherein the buried part of the cathode lead terminal includes a guide part that rises from the cathode connection surface to regulate a position of the at least one capacitor element.

8. The solid electrolytic capacitor according to claim 1, comprising a plurality of the capacitor elements stacked, the plurality of capacitor elements including the at least one capacitor element, wherein
   in at least one of the anode lead terminal or the cathode lead terminal, the buried part includes a sandwiched part disposed between a first element and a second element that are two adjacent capacitor elements selected from the plurality of capacitor elements.

9. The solid electrolytic capacitor according to claim 1, comprising a plurality of capacitor elements stacked, the plurality of capacitor elements including the at least one capacitor element, wherein
   the buried part of the cathode lead terminal includes an element mounting part that is adjacent to one outermost capacitor element among the plurality of capacitor elements.

10. The solid electrolytic capacitor according to claim 1, wherein the low-melting-point material is tin.

11. The solid electrolytic capacitor according to claim 1, wherein:
    at least a part of the main surface in the buried part of the at least one lead terminal is roughened, and
    at least a part of the main surface in the exposed part of the at least one lead terminal is not roughened.

12. The solid electrolytic capacitor according to claim 1, wherein, in the side surface of the buried part, at least a part of a second side surface region is covered with the low-melting-point material, the second side surface region being a region in less than or equal to 0.36 mm from the boundary between the buried part and the exposed part.

* * * * *